US012610211B2

(12) United States Patent
Liang et al.

(10) Patent No.: US 12,610,211 B2
(45) Date of Patent: Apr. 21, 2026

(54) METHOD AND ELECTRONIC DEVICE FOR DETERMINING SERVICE CONTENT BASED ON MOVEMENT TRACK AND PROVIDING SERVICE BASED ON DETERMINED SERVICE CONTENT

(71) Applicant: SAMSUNG ELECTRONICS CO., LTD., Suwon-si (KR)

(72) Inventors: Yanling Liang, Guangzhou (CN); Haimin Zhang, Guangzhou (CN); Jiayan Liang, Guangzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 418 days.

(21) Appl. No.: 18/090,175

(22) Filed: Dec. 28, 2022

(65) Prior Publication Data

US 2023/0209308 A1 Jun. 29, 2023

Related U.S. Application Data

(63) Continuation of application No. PCT/KR2022/021479, filed on Dec. 28, 2022.

(30) Foreign Application Priority Data

Dec. 28, 2021 (CN) .......................... 202111623479.0

(51) Int. Cl.
*H04W 4/02* (2018.01)
*H04W 4/021* (2018.01)
*H04W 4/50* (2018.01)

(52) U.S. Cl.
CPC .......... *H04W 4/027* (2013.01); *H04W 4/021* (2013.01); *H04W 4/50* (2018.02)

(58) Field of Classification Search
CPC ....... H04W 40/24; H04W 4/029; H04W 4/02; H04W 4/021; H04W 76/14; H04W 40/029

(Continued)

(56) References Cited

U.S. PATENT DOCUMENTS 7,719,987 B2 * 5/2010 Kobayashi ............ H04W 40/24
455/41.2
7,756,534 B2 * 7/2010 Anupam ................. H04W 4/20
455/458

(Continued)

FOREIGN PATENT DOCUMENTS

CN 109246584 A 1/2019
CN 112141044 A 12/2020

(Continued)

OTHER PUBLICATIONS

J. Lee, K. -S. Kim, H. Ogawa and Y. Kwon, "MixedWalk: Explore Ahead before Stepping in Mobile Augmented Reality Services," 2017 IEEE International Conference on AI & Mobile Services (AIMS), Honolulu, HI, USA, 2017, pp. 62-69, doi: 10.1109/AIMS. 2017.17. (Year: 2017).*

(Continued)

*Primary Examiner* — William D Cumming
(74) *Attorney, Agent, or Firm* — Sughrue Mion, PLLC

(57) ABSTRACT

Provided are an electronic device and a method performed by the electronic device connected with a mobile station. The method includes: acquiring a movement track of the mobile device moving to a target area; determining service content based on the acquired movement track; and providing a service to the mobile station in the target area, the service corresponding to the determined service content.

18 Claims, 7 Drawing Sheets

Schematic diagram of TOF positioning

Schematic diagram of TDOA positioning

Schematic diagram of AOA positioning

(58) Field of Classification Search
USPC ......... 455/41.2, 456.1, 458, 466, 406.1, 407
See application file for complete search history.

(56) References Cited

U.S. PATENT DOCUMENTS

| | | | |
|---|---|---|---|
| 11,349,589 B2 * | 5/2022 | Carlson | B61L 15/0058 |
| 11,391,835 B2 * | 7/2022 | Lee | G01S 5/0289 |
| 11,700,075 B2 * | 7/2023 | Carlson | B61L 27/70 |
| | | | 246/193 |
| 2005/0227791 A1 * | 10/2005 | McCreary | A63B 69/3658 |
| | | | 473/407 |
| 2005/0233815 A1 * | 10/2005 | McCreary | A63B 71/06 |
| | | | 473/131 |
| 2006/0293061 A1 * | 12/2006 | Kobayashi | H04W 40/24 |
| | | | 455/466 |
| 2007/0270163 A1 * | 11/2007 | Anupam | H04W 4/029 |
| | | | 455/456.1 |
| 2008/0232299 A1 | 9/2008 | Mosig | |
| 2011/0029364 A1 | 2/2011 | Roeding et al. | |
| 2013/0138265 A1 | 5/2013 | Kim et al. | |
| 2014/0080502 A1 | 3/2014 | Chiang et al. | |
| 2015/0258962 A1 * | 9/2015 | Khanu | G07C 9/00309 |
| | | | 701/2 |
| 2015/0291126 A1 * | 10/2015 | Nicholls | B60R 25/2054 |
| | | | 701/49 |
| 2018/0184618 A1 * | 7/2018 | Gotts | A01K 27/009 |
| 2019/0168712 A1 | 6/2019 | Yakovenko et al. | |
| 2019/0230213 A1 | 7/2019 | Konchan et al. | |
| 2019/0242989 A1 * | 8/2019 | Lee | H04W 4/029 |
| 2019/0263356 A1 | 8/2019 | Golsch et al. | |
| 2019/0275986 A1 | 9/2019 | Yakovenko et al. | |
| 2019/0302759 A1 | 10/2019 | Golsch | |
| 2020/0170222 A1 * | 6/2020 | Gotts | H04W 4/021 |
| 2020/0382898 A1 | 12/2020 | Onishi et al. | |
| 2022/0140931 A1 * | 5/2022 | Carlson | B61L 15/0027 |
| | | | 246/185 |
| 2023/0160995 A1 | 5/2023 | Oman et al. | |
| 2023/0209308 A1 * | 6/2023 | Liang | H04L 67/52 |
| | | | 455/456.1 |
| 2023/0339431 A1 * | 10/2023 | Kuehner | B60R 25/305 |
| 2023/0354230 A1 * | 11/2023 | Al-kadi | H04W 76/14 |
| 2024/0089022 A1 * | 3/2024 | Carlson | B61L 15/0027 |

FOREIGN PATENT DOCUMENTS

| | | | |
|---|---|---|---|
| JP | 2017-85449 A | 5/2017 | |
| KR | 10-0927597 B1 | 11/2009 | |
| KR | 10-2019-0130906 A | 11/2019 | |

OTHER PUBLICATIONS

Communication issued on May 22, 2024 by the European Patent Office for European Patent Application No. 22916734.1.

International Search Report (PCT/ISA/210) issued Mar. 24, 23 by the International Searching Authority in counterpart International Patent Application No. PCT/KR2022/021479.

Written Opinion (PCT/ISA/237) issued Mar. 24, 23 by the International Searching Authority in counterpart International Patent Application No. PCT/KR2022/021479.

Communication dated Jun. 24, 2025 issued by the European Patent Office in European Patent Application No. 22916734.1.

Communication issued Dec. 18, 2025 by the European Patent Office for EP Patent Application No. 22 916 734.1.

Communication dated Feb. 25, 2026, issued by Intellectual Property India in Indian Application No. 202447050273.

* cited by examiner

Schematic diagram of AOA positioning

Schematic diagram of TDOA positioning

Schematic diagram of TOF positioning

| | |
|---|---|
| Assistant driver's seat (voice assistance driving service) | Right-back passenger's seat (multimedia device projection) |
| Driver's seat (car bluetooth connection service) | Left-back passenger's seat (multimedia connection service) |

METHOD AND ELECTRONIC DEVICE FOR DETERMINING SERVICE CONTENT BASED ON MOVEMENT TRACK AND PROVIDING SERVICE BASED ON DETERMINED SERVICE CONTENT

CROSS-REFERENCE TO RELATED APPLICATIONS

This application is a by-pass continuation application of International Application No. PCT/KR2022/021479, filed on Dec. 28, 2022, which based on and claims priority to Chinese Patent Application No. 202111623479.0, filed on Dec. 28, 2021, in the Chinese Intellectual Property Office, the disclosures of which are incorporated by reference herein in their entireties.

BACKGROUND

1. Field

The present disclosure relates to a technical field of Internet of Things (IoT), and, more particularly, relates to a method, apparatus, electronic device and storage medium.

2. Description of Related Art

With the continuous advancement of technology, people also propose higher requirements for intelligence and convenience of smart device services. For example, in car Bluetooth connection scenarios, for driving convenience, it is usually necessary to connect a driver's mobile phone to car Bluetooth. At present, a commonly used car Bluetooth connection strategy is to try to connect in time sequence from near to far according to historical connection records. However, due to frequent occurrence of the historical connection records that are not in the driver's mobile phone, it often cannot automatically connect the driver's mobile phone to car Bluetooth with the current car Bluetooth connection strategy, and the driver needs to manually connect his/her mobile phone to the car Bluetooth. Intelligence and convenience are both in urgent need of improvement.

SUMMARY

The present disclosure provides a method, apparatus, electronic device and storage medium, to at least solve the above problems in the prior art.

According to an aspect of the disclosure, a method is performed by an electronic device. The method includes: acquiring a movement track of a mobile device moving to a target area; determining service content based on the acquired movement track; and providing a service to the mobile device in the target area, and wherein the service corresponds to the determined service content.

In one embodiment, the operation of determining the service content based on the movement track includes: determining entry route parameters of the mobile device entering the target area based on the movement track; and determining the service content corresponding to the entry route parameters provided in the target area, based on the determined entry route parameters.

In one embodiment, the operation of determining the service content corresponding to the entry route parameters provided in the target area, based on the determined entry route parameter, includes, for different entry route parameters, determining different service content corresponding to the entry route parameters provided in the target area.

In one embodiment, the entry route parameters include at least one of (i) an entry position or an entry passageway where the mobile device enters the target area determined based on the movement track or (ii) an initial position of the mobile device entering the target area determined based on the movement track.

In one embodiment, the entry position includes an intersection position of the movement track and a preset map that is a map of the target area.

In one embodiment, the acquiring the movement track of the mobile device moving to the target area includes acquiring the movement track of the mobile device moving to the target area by Ultra-Wide Band (UWB) positioning, and the target area and the mobile device are configured with UWB modules.

In one embodiment, the operation of providing the corresponding service in the target area includes providing the service to the mobile device or a user of the mobile device in the target area.

In one embodiment, the operation of providing the service to the mobile device includes: transmitting an instruction to a UWB module of the mobile device through a UWB module of the target area, and the mobile device is configured to trigger a corresponding module to accept provision of the service.

In one embodiment, the service includes at least one of a car Bluetooth connection service, a display mirroring service, a voice assistance driving service, a vehicle multimedia partitioning service, a permission differentiating service, and a home Internet of Things (IoT) devices differentiating service.

In one embodiment, the target area includes at least one of a vehicle interior area, an airport, a shopping mall, an amusement park, and a family residence.

According to another aspect of the disclosure, an electronic device includes: an acquiring unit configured to acquire a movement track of a mobile device moving to a target area; a determining unit configured to determine service content based on the movement track; and a serving unit configured to provide a service to the mobile device in the target area, and wherein the service corresponds the determined service content.

In one embodiment, the determining unit is configured to: determine entry route parameters of the mobile device entering the target area based on the movement track; and determine the service content corresponding to the entry route parameters provided in the target area, based on the determined entry route parameters.

In one embodiment, the determining unit is configured to, for different entry route parameters, determine different service content corresponding to the entry route parameters provided in the target area.

In one embodiment, the entry route parameters include at least one of (i) an entry position or an entry passageway where the mobile device enters the target area determined based on the movement track or (ii) an initial position of the mobile device entering the target area determined based on the movement track.

In one embodiment, the entry position includes an intersection position of the movement track and a preset map that is a map of the target area.

In one embodiment, the acquiring unit is configured to acquire the movement track of the mobile device moving to the target area by Ultra-Wide Band (UWB) positioning, and the target area and the mobile device are configured with UWB modules.

In one embodiment, the serving unit is configured to provide the service to the mobile device or a user of the mobile device in the target area.

In one embodiment, the serving unit is configured to: transmitting an instruction to a UWB module of the mobile device through a UWB module of the target area, and the mobile device is configured to trigger a corresponding module to accept provision of the service.

In one embodiment, the service includes at least one of a car Bluetooth connection service, a display mirroring service, a voice assistance driving service, a vehicle multimedia partitioning service, a permission differentiating service, and a home Internet of Things (IoT) devices differentiating service.

In one embodiment, the target area includes at least one of a vehicle interior area, an airport, a shopping mall, an amusement park, and a family residence.

In one embodiment, an electronic device for providing a service, the electronic device includes: at least one processor; and at least one memory storing computer executable instructions (executed by the at least one processor) cause the at least one processor to execute the above methods.

According to another aspect of the disclosure, an electronic device for performing communication with a mobile device, includes: an acquiring unit configured to acquire a data tracking the mobile device's movement from an initial position to a target area, via an indoor positioning technology; a determining unit configured to determine service content based on the data tracking the mobile device's movement; and a serving unit configured to provide a service in the target area to the electronic device, and wherein the service corresponds to the determined service content.

In one embodiment, the indoor positioning technology is Ultra-Wide Band (UWB), RFID (Radio Frequency Identification), ZigBee, or ultrasound.

It should be understood that the above general description and the following detailed description are exemplary and explanatory only and cannot limit the present disclosure.

BRIEF DESCRIPTION OF THE DRAWINGS

The drawings here, which are incorporated into and constitute a part of the description, illustrate embodiments consistent with the present disclosure, and explain principles of the present disclosure together with the description, and do not unduly limit the present disclosure. The above and other aspects, features, and advantages of certain embodiments of the present disclosure will be more apparent from the following description taken in conjunction with the accompanying drawings, in which.

DETAILED DESCRIPTION

Figure 1:
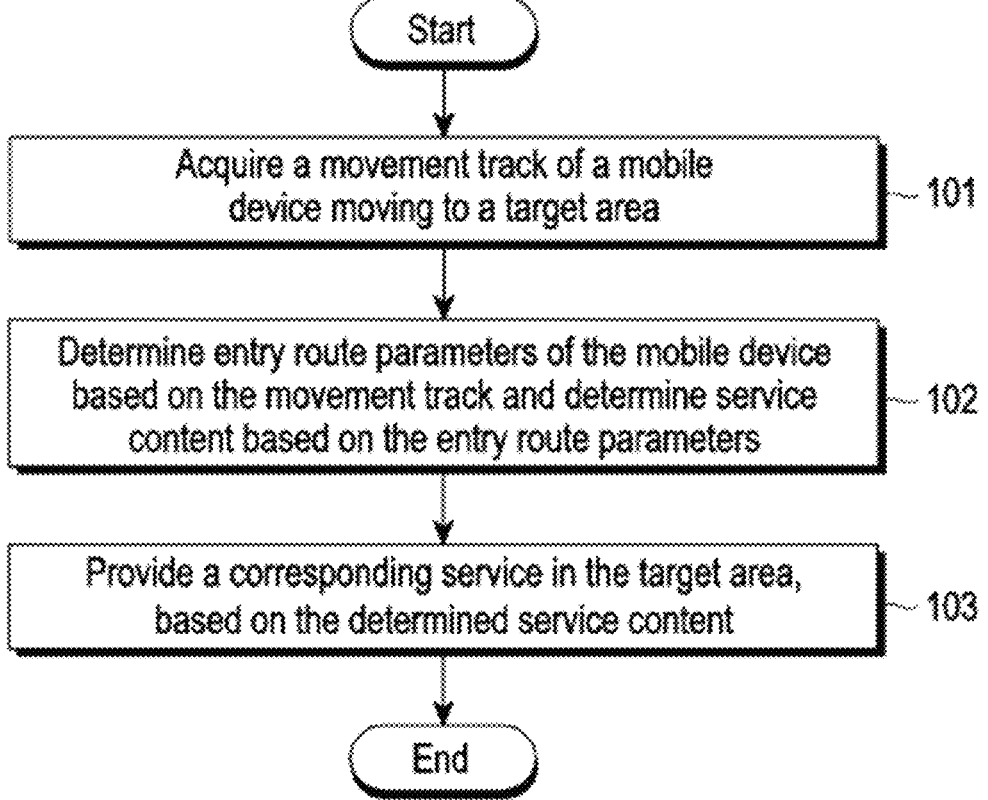
FIG. 1 is a flowchart illustrating a method according to an exemplary embodiment of the present disclosure.

In order to enable those skilled in the art to better understand the technical solutions of the present disclosure, the technical solutions in embodiments of the present disclosure will be clearly and completely described below in conjunction with the drawings.

It should be noted that the terms "first", "second" and the like in the description and claims as well as the above drawings of the present disclosure are used to distinguish similar objects, and are not necessarily used to describe a particular order or sequence. It should be understood that data used so may be interchanged under appropriate circumstances so that the embodiments of the present disclosure described here can be implemented in sequences other than those illustrated or described here. The implementations described in the following embodiments do not represent all implementations consistent with the present disclosure. Rather, they are merely examples of apparatus and method consistent with some aspects of the present disclosure that are specifically described in the appended claims.

It should be noted here that "at least one of several items" occurring in the present disclosure means including these three parallel situations, "any one of the several items", "a combination of any of the several items", and "an entirety of the several items". For example, "including at least one of A and B" means including the following three parallel situations: (1) including A; (2) including B; and (3) including A and B. For another example, "executing at least one of step one and step two" means the following three parallel situations: (1) executing step one; (2) executing step two; and (3) executing step one and step two.

With the continuous advancement of technology, smart devices are becoming more and more involved in people's production and life. However, the current smart device services still need to be improved in intelligence and convenience. For example, in car Bluetooth connection scenarios, it has implemented from manual connection to memory automatic connection, which brings great convenience to people. There are mainly two car Bluetooth automatic connection strategies currently: first, connecting the last connected mobile phone that is detected; and second, trying to connect in time sequence from near to far according to historical connection records. However, the first strategy has the problem that the last connected mobile phone may not be the driver's mobile phone, and the driver needs to connect manually. In the second strategy, if there is a plurality of mobile phones in the historical connection records at the same time, a case where the connected mobile phone is not the driver's mobile phone will also occur, and the driver needs to reconnect manually. Although in relevant technologies, NFC (Near Field Communication) and other technologies may be used to implement connection of a mobile phone through a simple touch to a corresponding position of a car system, it still requires manual operation of a driver, which is not convenient enough.

In order to improve intelligence and convenience of the current smart device services, the present disclosure proposes a method, an apparatus, an electronic device and storage medium. Specifically, a movement track of a mobile device moving to a target area is firstly acquired, thus, entry route parameters of the mobile device entering the target area may be determined through the movement track, so that different service content may be provided in the target area according to different entry route parameters, thereby improving intelligence and convenience of services.

Further, the method, apparatus, electronic device and storage medium according to the present disclosure implement positioning the mobile device in real time to form the movement track of the mobile device using high-precision positioning technology of UWB by disposing UWB modules in the mobile device and the target area, which may enable the obtained movement track to be more accurate. Hereinafter, the method, the apparatus, the electronic device, and the storage medium according to exemplary embodiments of the present disclosure will be specifically described with reference to FIG. 1 to FIG. 11.

FIG. 1 is a flowchart illustrating a method according to an exemplary embodiment of the present disclosure.

Referring to FIG. 1, at operation 101, a movement track of a mobile device moving to a target area may be acquired. For example, the movement track is a data related to a movement of the mobile device that moves to a target area. A movement track and a movement track data are used interchangeably throughout the present disclosure.

Here, the 'mobile device' refers to movable computing devices, such as a smart mobile phone, a tablet, a laptop, etc., and there is no limitation thereon. The 'target area' refers to an area where the mobile device is about to enter and generate services related to the mobile device. Depending on actual application scenarios, the target area, for example, but is not limited to, may be one of a vehicle interior area, an airport, a shopping mall, an amusement park and a family residence.

In one embodiment, the 'movement track' of the mobile device moving to the target area may be acquired by Ultra-Wide Band (UWB) positioning. The target area and the mobile device are configured with UWB modules. Specifically, the positioning technology of UWB does not use a carrier wave in a traditional communication system, but transmits data by transmitting and receiving extremely narrow pulses with nanoseconds or less, so that it has a bandwidth of GHz order and may be applied to positioning tracking and navigation of indoor stationary or moving objects and people, and can provide highly precise positioning accuracy.

Therefore, by configuring UWB modules in the target area and mobile device, a position where the mobile device moves to the target area may be accurately positioned in real time using the indoor positioning technology of UWB, thereby forming the movement track of the mobile device.

Here, for example, but is not limited to, a real-time position of the mobile device may be acquired through positioning algorithms, such as TOF (Time of Flight), TDOA (Time Difference of Arrival), TOA (Time of Arrival), AOA (Angle of Arrival) and the like.

Figure 2:
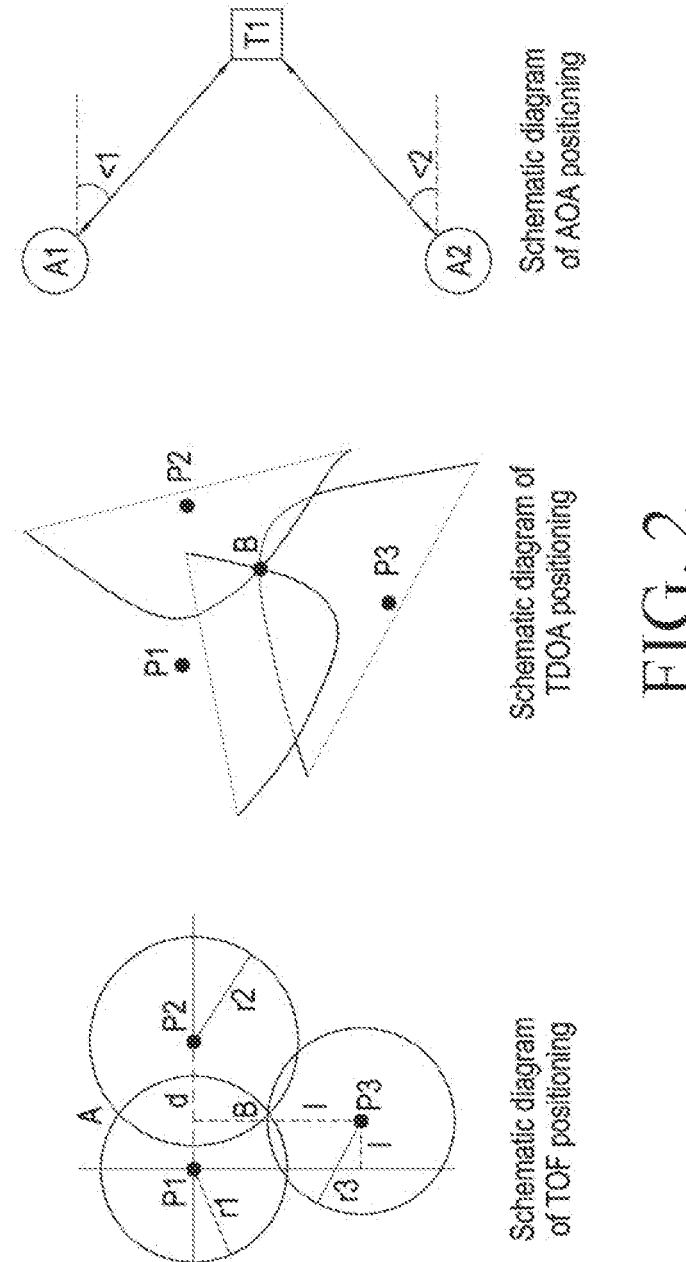
FIG. 2 is a schematic diagram illustrating positioning principles of TOF, TDOA and AOA according to an exemplary embodiment of the present disclosure.

FIG. 2 is a schematic diagram illustrating positioning principles of TOF, TDOA, and AOA, in one embodiment. Referring to FIG. 2, in the schematic diagram of TOF positioning, P1, P2 and P3 are respectively UWB base stations, point B is an object to be positioned, a circle is drawn by taking the UWB base station as a center of the circle and a distance between the positioned object and the UWB as a radius, and an intersection area is the estimated position of the positioned object. In the schematic diagram of TDOA positioning, P1, P2 and P3 are respectively the UWB base stations, three curves are respectively hyperboloids determined based on a distance difference between the positioned object B and the respective base stations, and an intersection position is the estimated position of the positioned object B. In the schematic diagram of AOA positioning, A1 and A2 are UWB base stations, T1 is an object to be positioned, and angles $\angle 1$ and $\angle 2$ between the UWB base stations and the positioned object T1 are measured, an intersection of rays formed according to the $\angle 1$ and $\angle 2$ is the estimated position of the positioned object T1.

In other embodiments, the movement track of the mobile device may also be acquired through indoor positioning technologies such as RFID (Radio Frequency Identification), ZigBee, or ultrasound, and there is no limitation thereon.

At operation 102, service content may be determined based on the movement track. Here, the service may include one of a car Bluetooth connection service, a display mirroring service, a voice assistance driving service, a vehicle multimedia partitioning service, a permission differentiating service, and a home Internet of Things (IoT) devices differentiating service, and the service content is a specific service item in the service.

In one embodiment, entry route parameters of the mobile device entering the target area may be firstly determined based on the acquired movement track, and then the service content corresponding to the entry route parameters provided in the target area may be determined based on the determined entry route parameters. Here, different service content corresponding to the entry route parameters provided in the target area may be determined for different entry route parameters, and the entry route parameters may include an entry position or an entry passageway where the mobile device enters the target area determined based on the movement track, or an initial position of the mobile device entering the target area determined based on the movement track.

Specifically, the target area may include different functional areas, and a functional area where the mobile device enters may be determined through the entry position where the mobile device enters the target area, thereby determining the service content. For example, the vehicle interior area may include a driver seat area, an assistant driver seat area and a back passenger area. An attribute of the mobile device may be determined through the position where the mobile device enters the vehicle (e.g., entering the vehicle from the driver's door) (e.g., the mobile device entering the vehicle from the driver's door is determined to be the driver's mobile device), and the corresponding service content (e.g., establishing a Bluetooth connection between the driver's mobile device and the car system) is provided to the mobile device with the target attribute.

In some embodiments, different service content may be provided for mobile devices with different attributes in the target area, and the attribute of the mobile device may be determined through the entry position or entry passageway where the mobile device enters the target area, thereby providing different content for the mobile devices with different attributes.

For example, services for VIPs are usually provided in amusement parks, airports or other places. The attribute of the mobile device may be determined through the entry passageway (e.g., a VIP passageway) where the mobile device enters the amusement park or airport (e.g., a mobile device entering from the VIP passageway is the device of a VIP user), thereby providing corresponding service content to the mobile device according to the attribute of the mobile device (e.g., pushing positions of VIP service sites set in the amusement part or airport to the mobile device of the VIP user, etc.).

For another example, employee passageways and tourist passageways are usually set in shopping malls. The entry position or entry passageway of entering a shopping mall may be determined through the movement track of the mobile device, thereby determining the attribute of the mobile device, and then providing different service content for devices with different attributes.

For example, the mobile device entering from the employee passageway may be determined as the employee's device, and the mobile device entering from the tourist passageway may be determined as the tourist's device; WiFi connection service in the shopping mall may be provided to the employee's device, and promotional information of the shopping mall may be pushed to the tourist's device; or, transportation modes (e.g., driving, subway or bus) by which users of the mobile devices come to the shopping mall may be determined based on positions where the mobile devices enter the shopping mall (e.g., entrance of underground garage, entrance of underground subway or entrance of the first floor), and relevant information, for example, parking payment information, subway or bus arrival time information, etc., may be pushed to the users' mobile devices when they leave the shopping mall.

In other embodiments, the initial position of the mobile device entering the target area may be determined based on the movement track, and the corresponding service may be provided to the user of the mobile device in the target area according to the relevant information of the initial position. For example, in a family residence, after the user of the mobile device learns in the study, the user goes to the bedroom for a rest, the movement track of the mobile device may be determined as from the study to the bedroom, and when the user used the air conditioner in the study, setting parameters of the air conditioner in the study may be automatically adapted to the air conditioner in the bedroom, and the user does not need to set it again, that is, the home Internet of Things (TOT) devices differentiating service may be provided based on the movement track of the mobile device.

In one embodiment, the entry position where the mobile device enters the target area includes an intersection position of the movement track and a preset map, the preset map is a map of the target area. Specifically, the preset map may be generated by collecting information about the relevant position of the target area through the UWB module in the target area, or the relevant position information (for example, information such as length, width, height of the target area, and positions of signs, etc.) of the target area may be collected in advance, and the relevant position information may be integrated into the UWB module of the target area to form a map of the target area. The present disclosure does not limit how to form a map of the target area. For example, when the target area is a vehicle interior area, a vehicle map may be formed through positions of car UWB base stations, dimensions of vehicle body, and positions and lengths of respective doors of the vehicle.

Referring back to FIG. 1, at operation 103, a corresponding service may be provided in the target area, based on the determined service content. In one embodiment, the service may be provided to the mobile device or a user of the mobile device in the target area. In the process of providing the service, an instruction may be transmitted to a UWB module of the mobile device through a UWB module of the target area, so that the mobile device triggers a corresponding module to accept provision of the service.

Specifically, after determining the service content to be provided for the mobile device, the corresponding module of the mobile device may not be turned on, resulting in the inability to provide the corresponding service. At this time, the instruction may be transmitted to the UWB module of the mobile device through the UWB module of the target area to turn on the corresponding module of the mobile device, for example, when the driver's mobile device is determined and the car Bluetooth connection service is ready to be provided to the mobile device, a predetermined signal may be transmitted to the driver's mobile device through the car UWB module. Then, the UWB module of the mobile device may receive and analyze the predetermined signal, and generate a broadcast of turning on the Bluetooth based on the analysis result, the mobile device system may forward the broadcast to the Bluetooth module. After receiving the broadcast, the Bluetooth module may turn on the Bluetooth to establish a Bluetooth connection between the car system and the driver's mobile device.

In order to clearly demonstrate the solutions shown in the present disclosure, the solutions shown according to the present disclosure will be described below in conjunction with the scenario of providing a service in the vehicle interior area.

Figure 3:
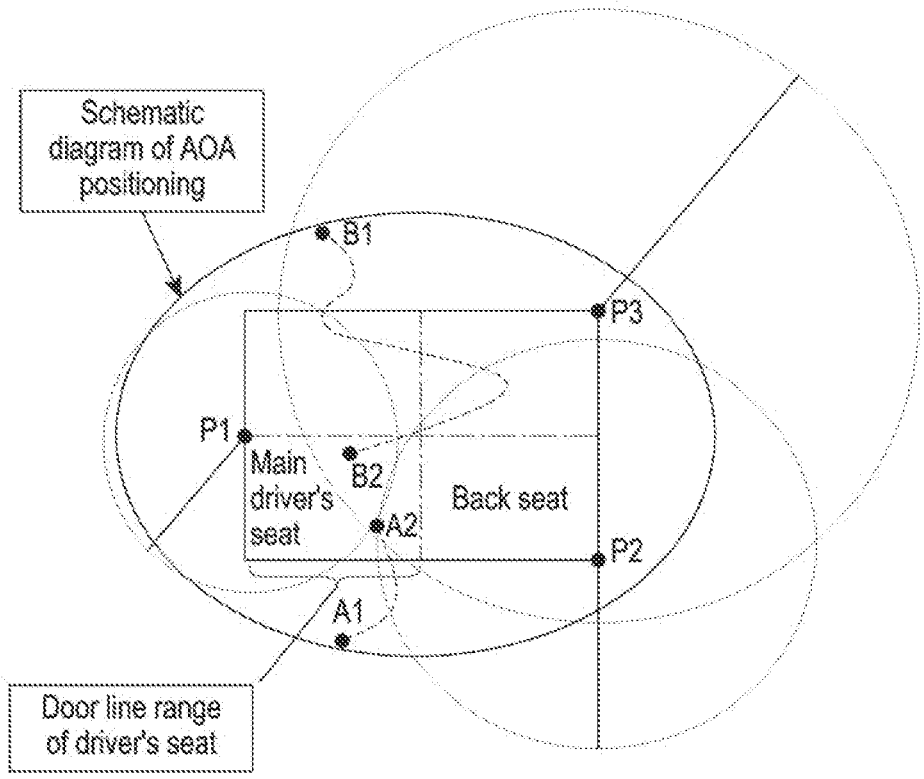
FIG. 3 is a schematic diagram illustrating an acquiring process of a movement track of a mobile device moving to a vehicle interior area according to an exemplary embodiment of the present disclosure.

FIG. 3 is a schematic diagram illustrating an acquiring process of a movement track of a mobile device moving to a vehicle interior area, in one embodiment. Referring to FIG. 3, the solid rectangular area is the vehicle interior area, P1 is an UWB base station at a front of the vehicle, P2 and P3 are two UWB base stations at a rear of the vehicle, and the black bold solid is a coordinate collection range of positions of the mobile device. A size of the coordinate collection range may be set, or the coordinate collection range may not be set, according to actual situation. As long as the UWB base station detects the mobile device, it starts to record position coordinates of the mobile device. A1-A2 and B1-B2 are respectively movement tracks of a mobile device A and a mobile device B. A position of the mobile device is positioned using a TOF positioning method in FIG. 3.

Position coordinate data generated by a distance change of the mobile device is continuously recorded within the coordinate collection range of the positions, and the movement track may be formed. According to the intersection position of the movement track and the vehicle interior area, the attribute of the mobile device may be obtained. For example, in FIG. 3, since the tracks A1-A2 intersect a door line of the driver's seat, it may be determined that the mobile device A enters the vehicle from the driver's door, and the mobile device A belongs to the driver.

In some embodiments, in order to further improve accuracy in determination, it may be determined that the mobile device A belongs to the driver when it is detected that the tracks A1-A2 intersect the door line of the driver's seat and the end points are located in the main driver's seat. Similarly, it may be determined that the mobile device B belongs to a passenger in the assistant driver's seat. Although the end points of the tracks B1-B2 in FIG. 3 are located in the main driver's seat, since the mobile device B has no intersection with the door line of the driver's seat, and according to directions of the tracks B1-B2, it may be determined that the mobile device B does not belong to the driver, that is to say, by determining the intersection position of the movement track of the mobile device and the vehicle interior area, the owner of the mobile device may be accurately determined.

Figures 4, 5:
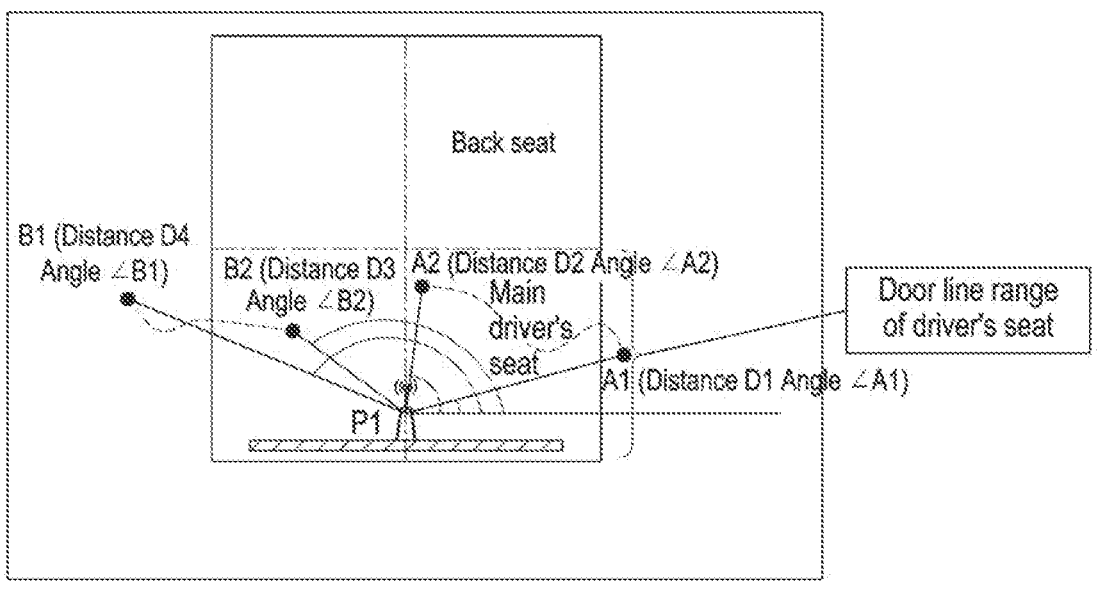
FIG. 4 is a schematic diagram illustrating the acquiring process of the movement track of the mobile device moving to the vehicle interior area according to another exemplary embodiment of the present disclosure.
FIG. 5 is a schematic diagram illustrating providing different services in the vehicle interior area according to an exemplary embodiment of the present disclosure.

FIG. 4 is a schematic diagram illustrating the acquiring process of the movement track of the mobile device moving to the vehicle interior area according to another exemplary embodiment of the present disclosure.

Referring to FIG. 4, the solid rectangular area is the vehicle interior area, P1 is the UWB base station at a front of the vehicle, A1-A2 and B1-B2 are respectively the movement tracks of the mobile device A and the mobile device B. The position of the mobile device is positioned using a positioning method combining the TOF positioning method and AOA positioning method in FIG. 4. For the specific positioning process, please refer to the relevant descriptions of the schematic diagram of AOA positioning in FIG. 2. Based on the same determination method as in the relevant descriptions on FIG. 3, it may be determined that the mobile device A belongs to the driver and the mobile device B belongs to the passenger in the assistant driver's seat.

After owners of the respective mobile devices in the vehicle are determined based on the movement tracks of the mobile devices, different service content may be provided for different owners or mobile devices. Here, the service may be a car Bluetooth connection service, a display mirroring service, a voice assistance driving service or a vehicle multimedia partitioning service. Specifically, in the car Bluetooth connection service, a Bluetooth connection may be established between the mobile device of the designated owner (e.g., the driver, the assistant driver seat passenger or the rear seat passenger) and the car system; in the display mirroring service, content of the mobile device of the designated owner (e.g., the driver, the assistant driver seat passenger or rear seat passenger) may be mapped to a car system display; in the voice assistance driving service, voice assistance driving may be performed using a voice of the designated owner (e.g., the driver, the assistant driver seat passenger or the rear seat passenger); in the vehicle multimedia partitioning service, each seat in the vehicle is equipped with a multimedia device, and for mobile devices of different owners, the multimedia device of the corresponding seat may be automatically connected, or projection may be performed automatically on the multimedia of the corresponding seat.

FIG. 5 is a schematic diagram illustrating providing different services in the vehicle interior area, in one embodiment. Referring to FIG. 5, the driver's mobile device may be connected to the car Bluetooth, the voice of the passenger in the assistant driver's seat may be used as a voice to assist driving, the content of the mobile device of the passenger in the left-back seat may be projected onto a multimedia device of the corresponding seat, and the mobile device of the passenger in the right-back seat may be connected to the multimedia device of the corresponding seat.

In the actual driving process, in order to facilitate the driver's driving, it may be necessary to establish a Bluetooth connection between the driver's mobile phone and the car system. In the related art, it cannot be determined that the mobile phone (that is automatically connected) is the driver's mobile phone. Therefore, there will be a situation that the driver manually reconnects to the Bluetooth, which is inconvenient.

In one embodiment, the movement tracks of all mobile phones in the current driving process may be obtained through the car UWB module, and the driver's mobile phone may be determined based on whether the movement track intersects with the door line of the driver's seat, to thereby determine that it must be the driver's mobile phone that connects to the Bluetooth of the car system, which avoids the situation that the driver manually reconnects to the Bluetooth, and improves convenience of the car Bluetooth connection. Here, in the process of establishing a Bluetooth connection between the driver's mobile phone and the car system, if it is detected that the mobile phone Bluetooth is not turned on, the mobile phone Bluetooth may be turned on through a UWB communication channel between the car Bluetooth module and the mobile phone.

Figure 6:
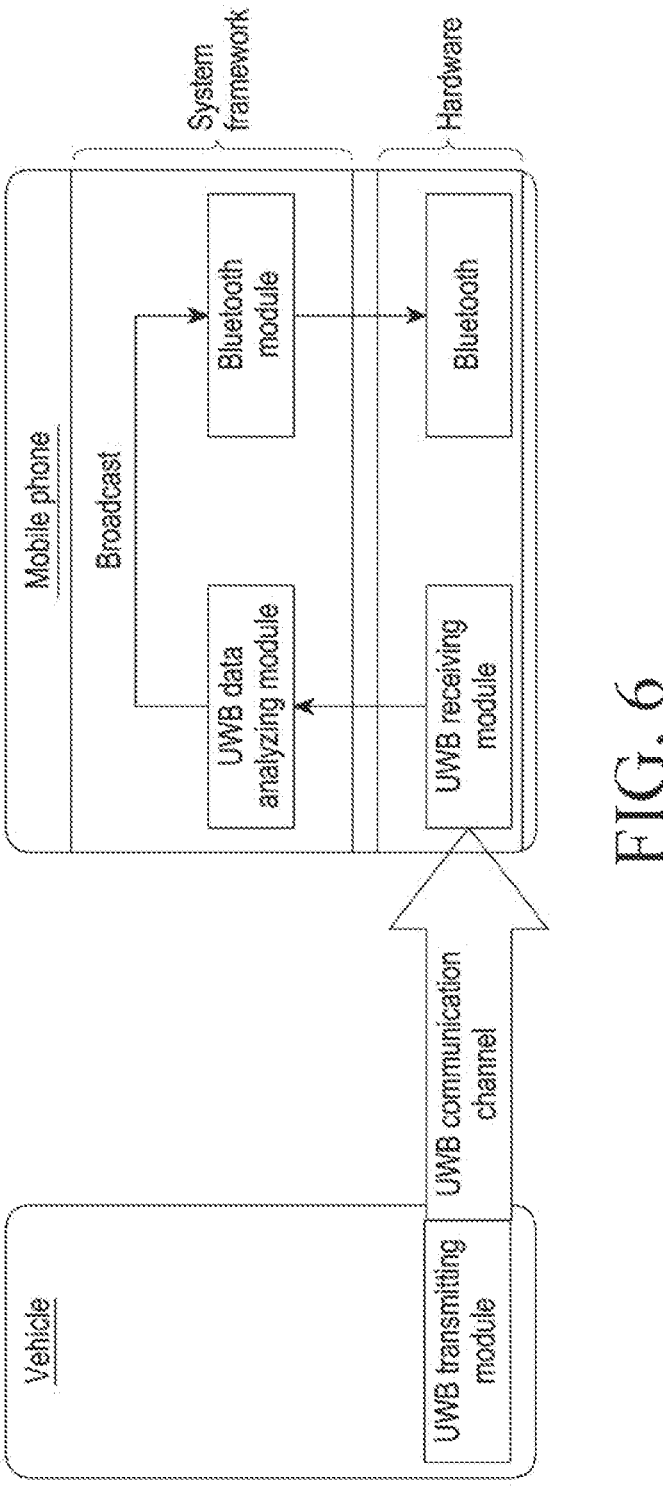
FIG. 6 is a schematic diagram illustrating a process of turning on mobile phone Bluetooth according to an exemplary embodiment of the present disclosure.

FIG. 6 is a schematic diagram illustrating a process of turning on mobile phone Bluetooth, in one embodiment. Referring to FIG. 6, a UWB transmitting module in the car UWB module transmits a predetermined signal to a UWB receiving module of the driver's mobile phone through the UWB communication channel, and a UWB parsing module of the mobile phone reads and parses the predetermined signal, and generates a broadcast of turning on the Bluetooth based on the parsing result, the mobile phone system forwards the broadcast to the Bluetooth module, and after receiving the broadcast, the Bluetooth module may turn on the Bluetooth to establish a Bluetooth connection between the car system and the driver's mobile phone. After detecting that the Bluetooth of the mobile phone is on or turning on the Bluetooth of the mobile phone, a Bluetooth connection between the driver's mobile phone and the car system may be established using the relevant prior art.

Figures 7, 8:
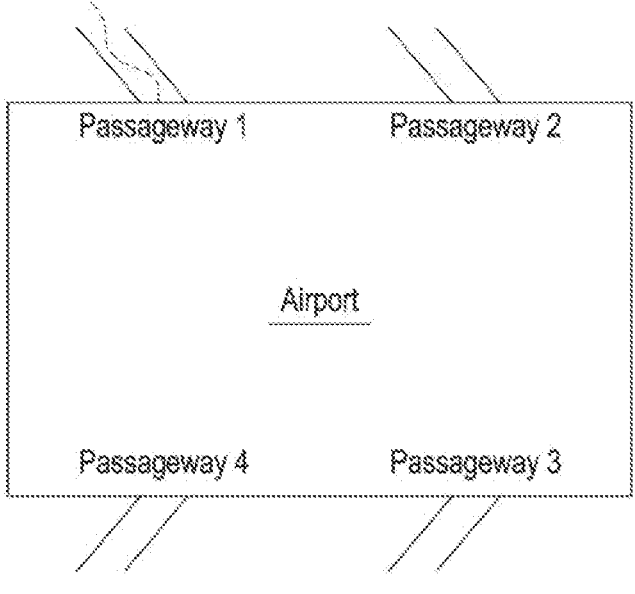
FIG. 7 is a schematic diagram illustrating providing a service to the mobile device in an airport according to an exemplary embodiment of the present disclosure.
FIG. 8 is a schematic diagram illustrating providing a service to the mobile device in a shopping mall according to an exemplary embodiment of the present disclosure.

FIG. 7 is a schematic diagram illustrating providing a service to the mobile device in an airport, in one embodiment. Referring to FIG. 7, there are 4 entry passageways in the airport, among which a first passageway ("passageway 1") is a VIP passageway. At this time, the movement track of the mobile device coincides with the first passageway ("passageway 1"). Therefore, it may be determined that the mobile device belongs to a VIP user, and position information of VIP service sites in the airport may be transmitted to the mobile device.

FIG. 8 is a schematic diagram illustrating providing a service to the mobile device in a shopping mall, in one embodiment. Referring to FIG. 8, there are three entrances in the shopping mall, among which a first entrance ("entrance 1") is the entrance of the underground garage, a second entrance ("entrance 2") is the subway entrance, and a third entrance ("entrance 3") is the entrance of the first floor of the shopping mall. At this time, the movement track of the mobile device coincides with the second entrance ("entrance 2"). Therefore, it may be determined that the user of the mobile device reaches the shopping mall by taking the subway, and when the user leaves the shopping mall, information of the subway arrival time may be pushed to the mobile device of the user.

Figure 9:
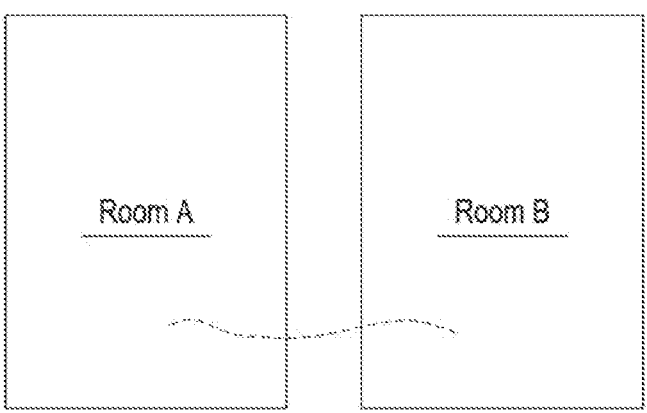
FIG. 9 is a schematic diagram illustrating providing a service based on the movement track of the mobile device in a family residence according to an exemplary embodiment of the present disclosure.

FIG. 9 is a schematic diagram illustrating providing a service based on the movement track of the mobile device in a family residence, in one embodiment.

Referring to FIG. 9, there are a room A and a room B, when it is detected that the movement track of the mobile device is from the room A to the room B, and the user of the mobile device has turned on the air conditioner in the room A. At this time, the setting parameters of the air conditioner in the room A may be automatically adapted to the air conditioner in the room B, and the user does not need to manually turn on the air conditioner in the room B, which improves convenience.

Figure 10:
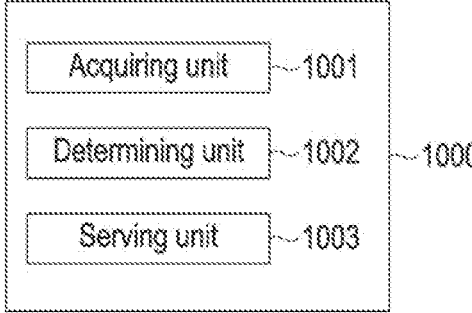
FIG. 10 is a block diagram illustrating a service providing apparatus according to an exemplary embodiment of the present disclosure.

FIG. 10 is a block diagram illustrating a service providing apparatus, in one embodiment. Referring to FIG. 10, in one embodiment, a service providing apparatus 1000 includes an acquiring unit 1001, a determining unit 1002, and a serving unit 1003.

The acquiring unit 1001 may acquire a movement track of a mobile device moving to a target area. The determining unit 1002 may determine service content based on the movement track. The serving unit 1003 may provide a corresponding service in the target area, based on the determined service content.

Since the method shown in FIG. 1 may be executed by the service providing apparatus 1000 shown in FIG. 10, and the acquiring unit 1001, the determining unit 1002 and the serving unit 1003 may respectively execute operations corresponding to operation 101, operation 102 and operation 103 in FIG. 1. Therefore, for any relevant detail involved in the operations performed by the respective units in FIG. 10, please refer to the corresponding descriptions on FIG. 1. For example, the service providing apparatus 1000 may be a module or a station providing the indoor positioning technologies, such as UWB, RFID, ZigBee, or ultrasound.

In addition, it should be noted that although the service providing apparatus 1000 is divided into units for performing corresponding processing, respectively, when described above, it is clear to those skilled in the art that the processing performed by the above respectively unit may also be performed in the case where the service providing apparatus 1000 does not perform any specific unit division or there is no clear demarcation between the units. In addition, the service providing apparatus 1000 may also include other units, for example, a data processing unit, a storage unit, etc.

Figure 11:
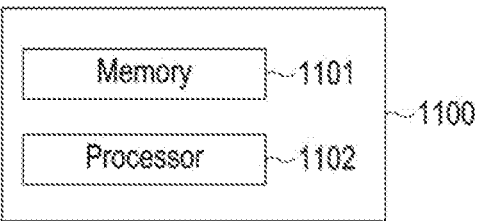
FIG. 11 is a block diagram illustrating an electronic device according to an exemplary embodiment of the present disclosure.

FIG. 11 is a block diagram illustrating an electronic device 1100, in one embodiment. Referring to FIG. 11, the electronic device 1100 includes at least one memory 1101 and at least one processor 1102, the at least one memory 1101 stores a set of computer executable instructions. When executed by the at least one processor 1102, the set of computer executable instructions executes the method In one embodiment. For example, the electronic device 1100 may correspond to the service providing apparatus 1000.

As an example, the electronic device 1100 may be a PC computer, a tablet device, a personal digital assistant, a smart phone, or other devices capable of executing the above set of instructions. Here, the electronic device 1100 does not have to be a single electronic device, but may also be a collection of any device or circuit that may execute the above instructions (or set of instructions) separately or jointly. The electronic device 1100 may also be a part of an integrated control system or a system manager, or may be configured as a portable electronic device interconnecting with a local or remote (e.g., via wireless transmission) interface.

In the electronic device 1100, the processor 1102 may include a central processing unit (CPU), a graphics processing unit (GPU), a programmable logic device, a dedicated processor system, a microcontroller, or a microprocessor. As an example rather than a limitation, the processor may also include an analog processor, a digital processor, a microprocessor, a multi-core processor, a processor array, a network processor, etc.

The processor 1102 may execute instructions or codes stored in the memory 1101. The memory 1101 may also store data. Instructions and data may also be transmitted and received via a network through a network interface device. The network interface device may adopt any known transmission protocol.

The memory 1101 may be integrated with the processor 1102, for example, an RAM or flash memory is arranged in an integrated circuit microprocessor, etc. In addition, the memory 1101 may include an independent device, such as an external disk drive, a storage array, or any other storage device that may be used by a database system. The memory 1101 and the processor 1102 may be operatively coupled, or may communicate with each other, for example, through an I/O port, a network connection, etc., so that the processor 1102 can read files stored in the memory.

In addition, the electronic device 1100 may also include a video display (such as a liquid crystal display) and a user interaction interface (such as a keyboard, a mouse, a touch input device, etc.). All components of the electronic device 1100 may be connected to each other via a bus and/or a network.

In one embodiment, there is also provided a computer readable storage medium. Instructions, when executed by at least one processor, cause the at least one processor to execute the method according to the present disclosure. Examples of the computer readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), Flash, Non-Volatile Memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state drive (SSD), card storage (such as, Multimedia Cards, Secure Digital (SD) Cards or Extreme Digital (XD) Cards), magnetic tapes, floppy disks, magneto-optical data storage devices, optical data storage devices, hard disks, solid state disks, and any other device. The any other device is configured to store a computer program and any relevant data, data files and data structures in a non-transitory manner and to provide the computer program and any relevant data, data files and data structures to the processor or computer, so that the processor or computer may execute the computer program. The computer program in the above computer readable storage medium may run in an environment deployed in computer devices such as a client, a host, an agent device and a server. In addition, in one example, the computer program and any relevant data, data files and data structures are distributed over networked computer systems, so that the computer program and any relevant data, data files and data structures are stored, accessed and executed in a distributed manner by one or more processors or computers.

A method, an apparatus, an electronic device, and storage medium according to the present disclosure firstly acquire a movement track of a mobile device moving to a target area, thus, entry route parameters of the mobile device entering the target area may be determined through the movement track, so that different service content may be provided in the target area according to different entry route parameters, thereby improving intelligence and accuracy of services.

Further, a method, an apparatus, an electronic device, and storage medium according to the present disclosure implements positioning the mobile device in real time to form the movement track of the mobile device using high-precision positioning technology of UWB by disposing UWB modules in the mobile device and the target area, which may enable the obtained movement track to be more accurate.

After considering the description and practicing the invention disclosed here, those skilled in the art will easily conceive of other embodiments of the present disclosure. The present disclosure is intended to cover any variations, uses, or adaptations of the present disclosure that follow the general principles of the present disclosure and include common knowledge or commonly used technical means in the art not disclosed by the present disclosure. The description and examples are only regarded exemplary only, and the true scope and spirit of the present disclosure are indicated by the following claims.

It should be understood that the present disclosure is not limited to the precise structures described above and illustrated in the drawings, and that various modifications and variations may be made without departing from the scope thereof. The scope of the present disclosure is limited only by the appended claims. Throughout the present disclosure, "Bluetooth" is interchangeable with "Bluetooth®" or "Bluetooth™"; "NFC" is interchangeable with "NFC®" or "NFC"; Zigbee is interchangeable with "Zigbee®" or "Zigbee™".

What is claimed is:

1. A method performed by an electronic device, the method comprising:
    acquiring a movement track of a mobile device moving to a target area;
    determining entry route parameters of the mobile device entering the target area based on the movement track;
    determining service content corresponding to the entry route parameters provided in the target area, based on the determined entry route parameters; and
    providing a service to the mobile device in the target area, wherein the service corresponds to the determined service content.

2. The method of claim 1, wherein the determining the service content corresponding to the entry route parameters provided in the target area, based on the determined entry route parameter, comprises, for different entry route parameters, determining different service content corresponding to the entry route parameters provided in the target area.

3. The method of claim 1, wherein the entry route parameters comprise at least one of:
    an entry position or an entry passageway where the mobile device enters the target area determined based on the movement track, or
    an initial position of the mobile device entering the target area determined based on the movement track.

4. The method of claim 3, wherein the entry position comprises an intersection position of the movement track and a preset map that is a map of the target area.

5. The method of claim 1, wherein the acquiring the movement track of the mobile device moving to the target area comprises acquiring the movement track of the mobile device moving to the target area by Ultra-Wide Band (UWB) positioning, and
    wherein the target area and the mobile device are configured with UWB modules.

6. The method of claim 1, wherein the providing the service to the mobile device comprises transmitting an instruction to a Ultra Wide Band (UWB) module of the mobile device through a UWB module of the target area, and
    wherein the mobile device is configured to trigger a corresponding module to accept provision of the service.

7. The method of claim 1, wherein the service comprises at least one of a display mirroring service, a voice assistance driving service, a vehicle multimedia partitioning service, a permission differentiating service, or a home Internet of Things (IoT) devices differentiating service.

8. The method of claim 1, wherein the target area comprises at least one of a vehicle interior area, an airport, a shopping mall, an amusement park, or a family residence.

9. An electronic device for providing a service, the electronic device comprising:
    memory storing instructions; and
    at least one processor operatively connected to the memory,
    wherein the instructions, when executed by the at least one processor individually or collectively, cause the electronic device to:
        acquire a movement track of a mobile device moving to a target area;
        determine entry route parameters of the mobile device entering the target area based on the movement track;
        determine service content corresponding to the entry route parameters provided in the target area, based on the determined entry route parameters; and
    provide the service to the mobile device in the target area, wherein the service corresponds to the determined service content.

10. The electronic device of claim 9, wherein the the instructions, when executed by the at least one processor individually or collectively, cause the electronic device to determine, for different entry route parameters, the different service content corresponding to the entry route parameters provided in the target area.

11. The electronic device of claim 9, wherein the entry route parameters comprise at least one of:
    an entry position or an entry passageway where the mobile device enters the target area determined based on the movement track, or
    an initial position of the mobile device entering the target area determined based on the movement track.

12. The electronic device of claim 11, wherein the entry position comprises an intersection position of the movement track and a preset map that is a map of the target area, and
    wherein the instructions, when executed by the at least one processor individually or collectively, cause the electronic device to acquire the movement track of the mobile device moving to the target area by Ultra-Wide Band (UWB) positioning, and
    wherein the target area and the mobile device are configured with UWB modules.

13. The electronic device of claim 9, wherein the instructions, when executed by the at least one processor individually or collectively, cause the electronic device to provide the service to the mobile device or a user of the mobile device in the target area.

14. The electronic device of claim 13, wherein the instructions, when executed by the at least one processor individually or collectively, cause the electronic device to transmit an instruction to a first UWB module of the mobile device through a second UWB module of the target area, and wherein the mobile device is configured to trigger a corresponding module to accept provision of the service.

15. The electronic device of claim 9, wherein the service comprises at least one of a car Bluetooth connection service, a display mirroring service, a voice assistance driving service, a vehicle multimedia partitioning service, a permission differentiating service, or a home Internet of Things (IoT) devices differentiating service.

16. The electronic device of claim 9, wherein the target area comprises at least one of a vehicle interior area, an airport, a shopping mall, an amusement park, or a family residence.

17. An electronic device for performing communication with a mobile device, the electronic device comprising:

memory storing instructions; and at least one processor operatively connected to the memory, wherein the instructions, when executed by the at least one processor individually or collectively, cause the electronic device to:

acquire a data tracking movement of the mobile device from an initial position to a target area, via an indoor positioning technology;

determine entry route parameters of the mobile device entering the target area based on the data tracking the movement of the mobile device;

determine service content corresponding to the entry route parameters provided in the target area, based on the determined entry route parameters; and provide a service in the target area to the electronic device, wherein the service corresponds to the determined service content.

18. The electronic device of claim 17, wherein the indoor positioning technology is Ultra-Wide Band (UWB), RFID (Radio Frequency Identification), or ultrasound.

* * * * *